US005689558A

United States Patent [19]
Osgood et al.

[11] Patent Number: 5,689,558
[45] Date of Patent: Nov. 18, 1997

[54] TELEPHONE HANDSET HOLDER

[76] Inventors: Alan G. Osgood; Michael A. Osgood-Graver, both of 13012 SE. 164th St., Renton, Wash. 98058

[21] Appl. No.: 623,895

[22] Filed: Mar. 25, 1996

[51] Int. Cl.$^6$ ........................................ H04M 1/00
[52] U.S. Cl. .......................... 379/430; 379/430; 379/449
[58] Field of Search ........................ 379/430, 449; 381/183, 187

[56]  References Cited

U.S. PATENT DOCUMENTS

| | | | |
|---|---|---|---|
| 2,676,213 | 4/1954 | Anderson | 379/430 |
| 4,802,211 | 1/1989 | Huntley | 379/454 |
| 5,113,428 | 5/1992 | Fitzgerald | 379/61 |
| 5,191,602 | 3/1993 | Regen et al. | 379/58 |
| 5,233,650 | 8/1993 | Chen | 379/430 |
| 5,388,155 | 2/1995 | Smith | 379/446 |
| 5,407,113 | 4/1995 | Golliher | 379/430 |

FOREIGN PATENT DOCUMENTS

| | | | |
|---|---|---|---|
| 9322862 | 11/1993 | Australia | 379/430 |
| 4005783 | 9/1991 | Germany | 379/430 |
| 0187552 | 8/1991 | Japan | 379/430 |

*Primary Examiner*—Dwayne Bost
*Assistant Examiner*—Keith Ferguson

[57]  ABSTRACT

A telephone handset holder that mounts to the user's head or headgear. The handset holder, with handset attached, allows hands-free use of handset. The handset holder attaches to the backside of a telephone handset. The holder can accommodate a large variety of handsets for corded telephones, cordless telephones, cellular telephones, small two-way radios and other similar communication instruments. The handset holder can be quickly attached to and unattached from the back of handsets by means of small straps, hock and loop fasteners or suction cups. The handset holder is lightweight. The handset holder, with a handset attached, can be easily secured to the user's head by an over-the-head headband or by a wrap-around headband. The handset holder may be attached to a user's helmet or hard hat. The disclosed handset holder is simple and inexpensive to produce.

7 Claims, 11 Drawing Sheets

TELEPHONE HANDSET HOLDER

BACKGROUND

1. The Field of the Invention

The present invention relates to a headmounted telephone handset holder for corded telephones, cordless telephones, cellular telephones, small two-way radios and other similar communication instruments.

2. The Prior Art

Telephone handsets are devices commonly used to listen to telephone voice transmissions and to speak into the telephone. The term 'handset' as used here refers to any communication instrument with a speaker and microphone that users normally hold with their hands. Handsets are ubiquitous in modem society. They are used with conventional corded telephones, cordless telephones and modular cellular telephones. They are used extensively in compact cellular telephones that are self contained within a handset. They are also used for two-way radios and other communication devices. Users hold the handset next to their heads in order to listen to voice transmissions through the speaker and send voice transmissions through the microphone.

Conventional corded telephones, cordless telephones, cellular telephones and similar communication instruments are used extensively in home and work environments by a large portion of the population. People frequently use handsets to carry on a telephone conversation while engaged in other activities. These activities include reading, working at a computer, cooking, cleaning house, walking, driving an automobile, etc. Many of these activities can be performed easier, more efficiently and safer with two hands than with one hand. People using a telephone typically use one hand to hold the handset while engaged in these other activities. An apparatus that would allow hands free use of handsets would make it easier, more efficient and/or safer to perform other activities while speaking on a telephone. The prior art does not include any apparatus that can hold the large variety of handsets currently available.

Handsets come in a variety of shapes and sizes. Generally the speaker and the microphone are on the same side of the handset (the front). The speaker is normally towards the top end of the handset. The microphone is normally towards the bottom end of the handset. The speaker and microphone are normally from four (4) to six (6) inches apart. The fronts of handsets frequently have pushbuttons for dialing telephone numbers and for other functions. The back of handsets are normally smooth, although some handsets have pushbuttons on the back. Handsets generally range from approximately five (5) to approximately nine (9) inches long from top to bottom. They are usually from one (1) to two and a half(2½) inches wide from side to side. Handsets are normally three-fourths (¾) to two (2) inches deep from front to back. Handset shapes vary from simple geometric forms to complex shapes with compound curves. Handsets vary in weight from under four (4) ounces to over fourteen (14) ounces.

The prior art includes various methods to allow hands free operation of handsets. One approach is to use a device that props a handset between the user's head and shoulder. This type of device requires a fixed head to body posture. This is uncomfortable for many users.

A second approach involves devices that do not require the user to maintain a particular posture to hold a handset in position. U.S. Pat. No. 4,802,211 discloses a portable cordless telephone holder that rests on the user's shoulders. This rather large device requires the user to place the holder over his or her head, position restraining straps under his or her arms, and then secure the handset in the holder. The holder moves with the user's body, not the user's head. The user must limit head movements relative to the body in order to maintain proper distance to the microphone and earpiece. The device also restricts movement of the user's shoulders. The user must to avoid any impact to the handset when turning his or her head. The holder only secures handsets of limited ranges of shapes and sizes. This system has not met general acceptance by users.

A third approach is to substitute a headmounted earphone and microphone for the handset. U.S. Pat. Nos. 5,388,155 and 5,191,602 disclose headmounted earphones and microphones for use with cellular phones. These devices are designed for use with the input and output jacks on cellular phones. They can not be used with cordless phones that do not have input and output jacks.

A fourth approach is to mount the support for the handset directly to the user's head. U.S. Pat. No. 5,233,650 discloses a telephone support device that will hold a conventional telephone handset next to a user's head. This device has ear pads attached to a headband. A clip to hold a handset is attached to one end of the headband. The clip is placed against the front of the handset and wraps around the back of the handset. The sound from the telephone speaker passes through a hole in one ear pad. This device is substantially lighter and easier to use than the handset holder of U.S. Pat. No. 4,802,211.

The clip that holds the handset to the holder can secure only a limited range of handset shapes and sizes. The clip for U.S. Pat. No. 5,233,650 can not secure a wide variety of existing cordless or cellular telephones. Also the clip can interfere with and activate the pushbuttons on many styles of cordless and cellular telephones. The headband for U.S. Pat. No. 5,233,650 supports the handset at the location of the handset speaker. This maximizes the distance between the support point and the handset center of mass. This in turn maximizes the forward rotational torque on the handset and holder. The end of the handset with the microphone tends to turn downward. The handset holder must be large and strong enough to counter this torque.

BRIEF SUMMARY AND OBJECTS OF THE INVENTION

The present invention relates to a device that holds a telephone handset next to the user's head so as to allow hands free use of the handset. The device can be used with handsets for corded telephones, cordless telephones, cellular telephones, small two-way radios and other similar communication instruments.

More specifically the present invention relates to a headmounted telephone holder bracket that can be easily attached to and unattached from the back of a variety of styles and sizes of handsets. The holder bracket can be permanently attached to handsets. The holder bracket, with telephone handset attached, can be quickly secured to the user's head.

BRIEF DESCRIPTION OF THE FIGURES

FIG. 4 is an exploded front view showing hock and loop fasteners on the back of the handset and the inside of the holder bracket lower section. FIG. 4 also shows a self curling headband.

REFERENCE NUMERALS IN FIGURES

1-Handset holder bracket (holder bracket).
2-Holder bracket upper section
3-Holder bracket middle section
4-Holder bracket lower section
5-Studs on the outside of holder bracket lower section
6-Restraining strap
7-Handset
8-Handset speaker
9-Handset microphone
10-Loops on restraining straps
11-Conforming layer
12-Back of handset
13-Stabilizer bar
14-Snap fastener studs on outside of stabilizer bar
15-Snap fastener sockets on inside surface of holder bracket upper section
16-Over-the-head headband
17-Adjustment cushions on inside of over-the-head headband
18-Adjustment pads on inside surface of holder bracket upper section
19-Snap fastener studs on outside surface of holder bracket upper section
20-Snap fastener sockets on inside of over-the-head headband
21-Self-curling over-the-head headband
22-Pad on end of self curling over-the-head headband
23-Hock and loop fasteners on inner side of holder bracket lower section
24-Hock and loop fasteners on back side of handset
25-Suction cups
26-Shape adjustment pads on inside of stabilizer bar
27-Wrap-around headband.
28-Hock and loop fasteners on outer side of stabilizer bar
29-Hock and loop fastener on wraparound headband
30-Non-slip surface or adhesive
31-Helmet external attach plate
32-Snap fastener studs on helmet attach plate
33-Helmet outer surface
34-Adhesive
35-Angle adjustment shim
36-Hard hat internal attach plate
37-Snap fastener sockets on hard hat attach plate
38-Hard hat inner surface
39-In-line handset holder bracket
40-In-line handset holder bracket upper section
41-In-line handset holder bracket middle section
42-In-line handset holder bracket lower section

DETAILED DESCRIPTION OF THE PREFERRED EMBODIMENTS

Summary of Invention

The present invention provides an apparatus that allows hands-free use of handsets. This apparatus is compatible with the many different styles of handsets used for corded telephones, cordless telephones, and cellular telephones, small two-way radios and other similar communication instruments. The apparatus is inexpensive to produce and easy to use. The apparatus includes a bracket that is secured to the user's head and to the back of the handset.

The telephone holding bracket is attached to the back of the handset by one or more of the following means:

1. Straps, cords, strings or similar devices that wrap around the handset,
2. One or more suction cups,
3. Hock and loop fastener, miniature hook and eye attachments, or similar multi-point variable position attaching systems,
4. Adhesive.

The telephone holding bracket is secured to the user's head by one or more of the following means:

1. One or more headbands which extend from the holder bracket to the other side of the user's head,
2. A headband which wraps around the user's head,
3. A device for attaching to a helmet, hard hat or other headgear.

The headbands may be semi-rigid for position stability, flexible for comfort and easy storage, or even self curling for automatic storage.

Detailed Description of Invention

Reference is now made to the drawings wherein like parts are designated with like numerals throughout.

Figure 1:
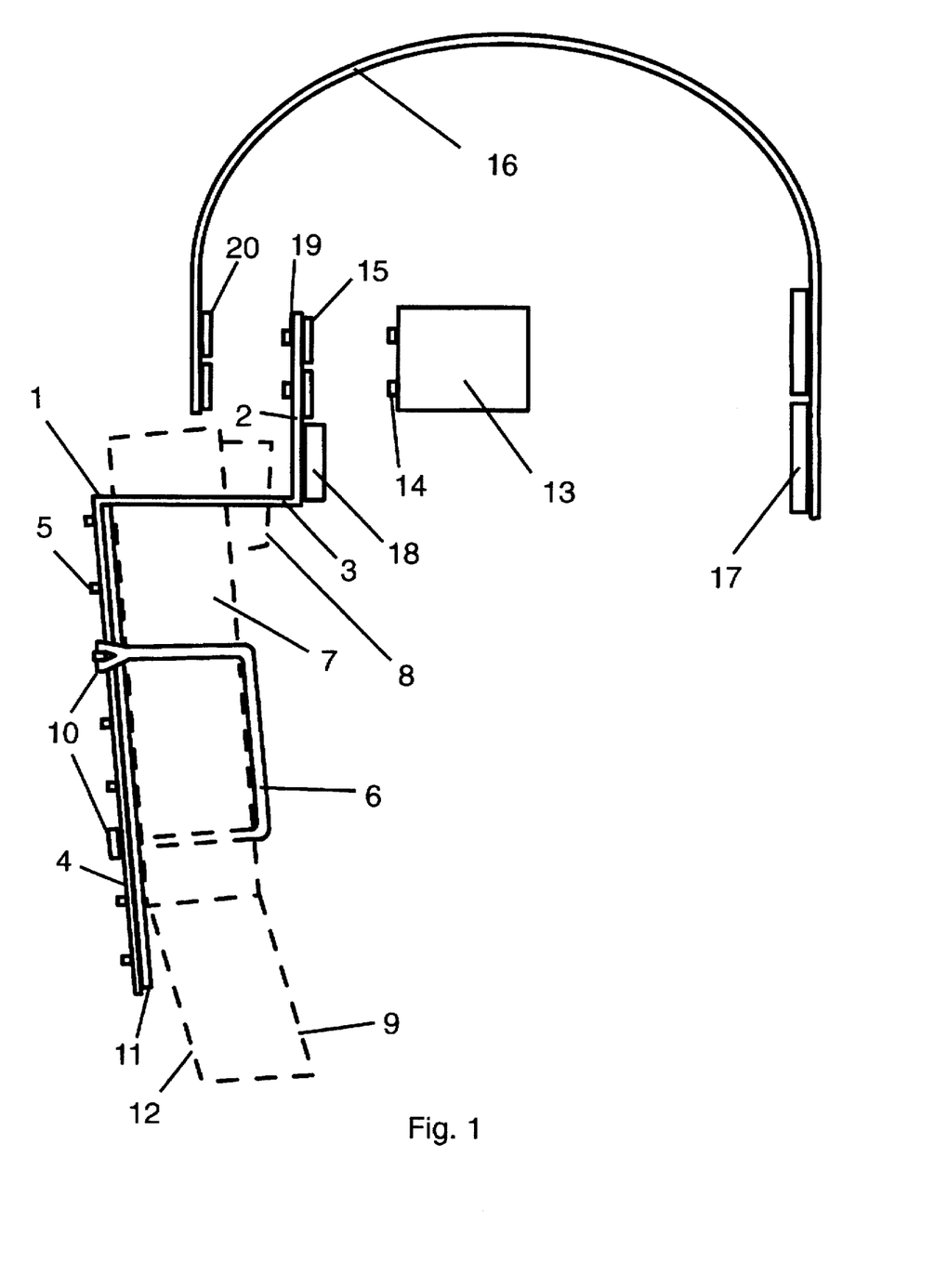
FIG. 1 is an exploded front view of the basic telephone holder apparatus. The telephone holder bracket is shown secured to the back of a handset. An over-the-head headband is attached to the holder bracket.

FIG. 1 is an illustration of the basic version of the preferred embodiment of the handset holding apparatus. The holder bracket 1 consists of a rigid structure so shaped as to extend from the side of the user's head to the back of a handset. To facilitate explanation, the holder bracket 1 will be described as three (3) sections: the holder bracket upper section 2, the holder bracket middle section 3, and the holder bracket lower section 4.

The holder bracket upper section 2 is approximately one (1) inch wide and two (2) inches tall. The inner surface of the holder bracket upper section 2, is positioned towards to the user's head when the handset holder is being used.

The holder bracket middle section 3 extends out from the side of the user's head approximately two and a quarter (2.25) inches. The 2.25 inch extension accommodates handsets up to approximately two (2) inches from front to back. This includes most styles of handsets currently in use. The extension of the holder bracket middle section 3 can be reduced to approximately one (1) inch or less. The one inch extension will accommodate many of the thinner handsets (those of approximately 0.75 inches or less from front to back).

The holder bracket lower section 4 is approximately four (4) inches long by one (1) inch wide. The holder bracket lower section 4 is approximately vertical from front to back. The holder bracket lower section is angled in towards the user's head approximately twenty (20) degrees. The side of the holder bracket lower section 4 towards the user's head has a nonslip surface.

The widths of the holder bracket upper, middle and lower sections can be reduced to approximately one-half (½) inch for lighter handsets of less than six (6) ounces. Conversely the widths of these sections can be increased up to approximately two (2) inches for heavier handsets or vigorous activities. FIG. 1 shows small studs 5 that protrude from the back of the holder bracket lower section 4. The studs 5 are approximately three-sixteenth (3/16) of an inch long and approximately one-eighth (⅛) of an inch wide. The studs 5 are arranged in two rows on the back of the holder bracket lower section 4.

Figure 2:
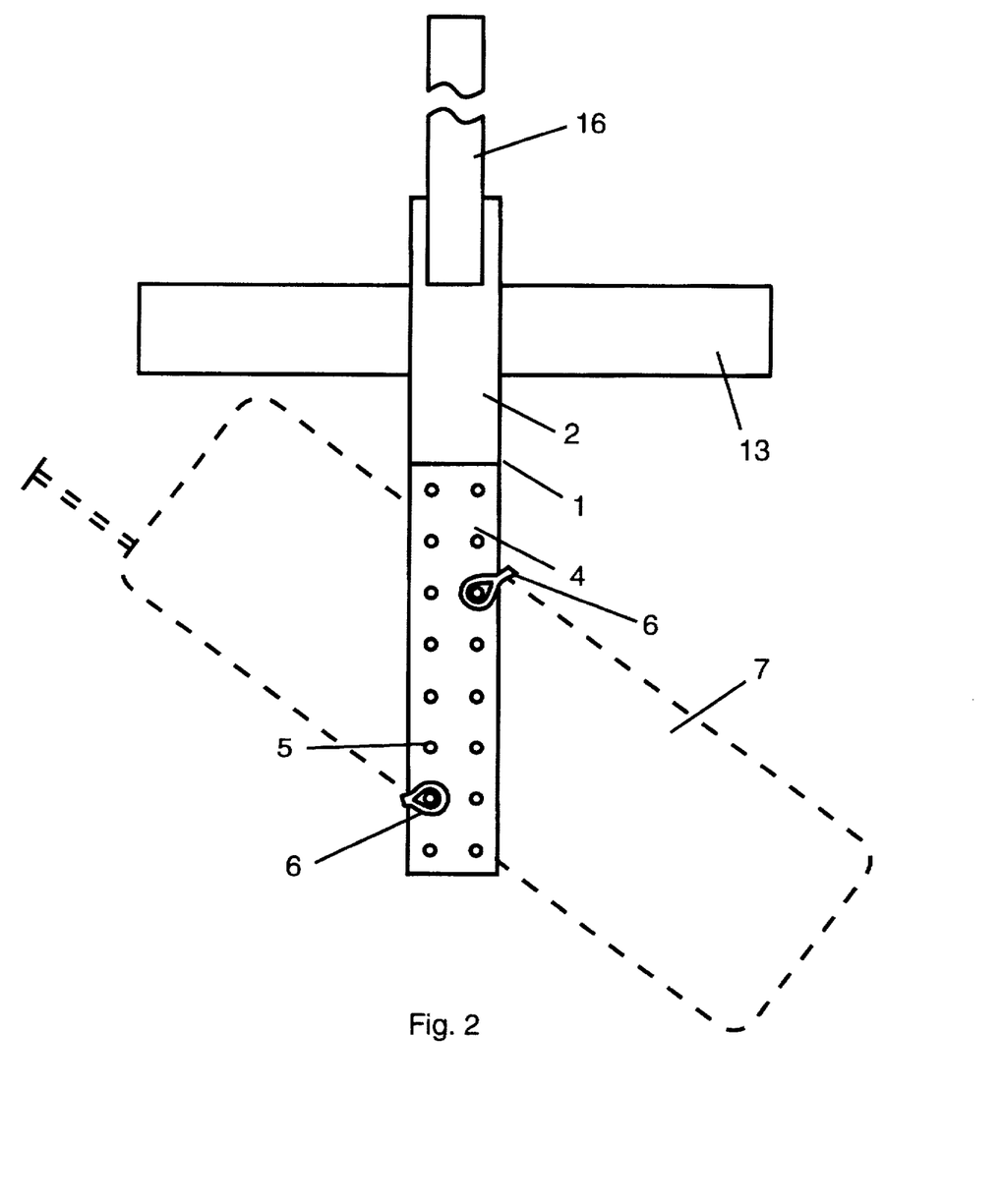
FIG. 2 is a side view of the handset holder device secured to the back of a handset.

A restraining strap 6 extends from one stud 5 on the back of the holder bracket lower section 4 around the handset 7 to another stud 5. The restraining strap 6 can be positioned around the handset 7 so that it is close to the center of mass of the handset. This reduces the torque of the handset on the holder bracket compared to attaching the holder bracket near the end of the handset. This is particularly important for medium-to-heavy weight handsets. Medium to heavy weight handsets generally weigh between approximately six (6) and fourteen (14) ounces. The restraining strap 6 can be adjusted so that it does not interfere with pushbuttons or other mechanisms on the handset. The restraining strap 6 can be connected to studs 5 so as to hold the handset speaker 8 and handset microphone 9 in the preferred position for use. Users generally prefer the handset microphone 9 to be angled down approximately thirty (30) degrees from horizontal relative to the handset speaker 8. FIGS. 1 and 2 show the handset 7 as it is secured to the holder 1 for use on the right side of a user's head.

Figure 3:
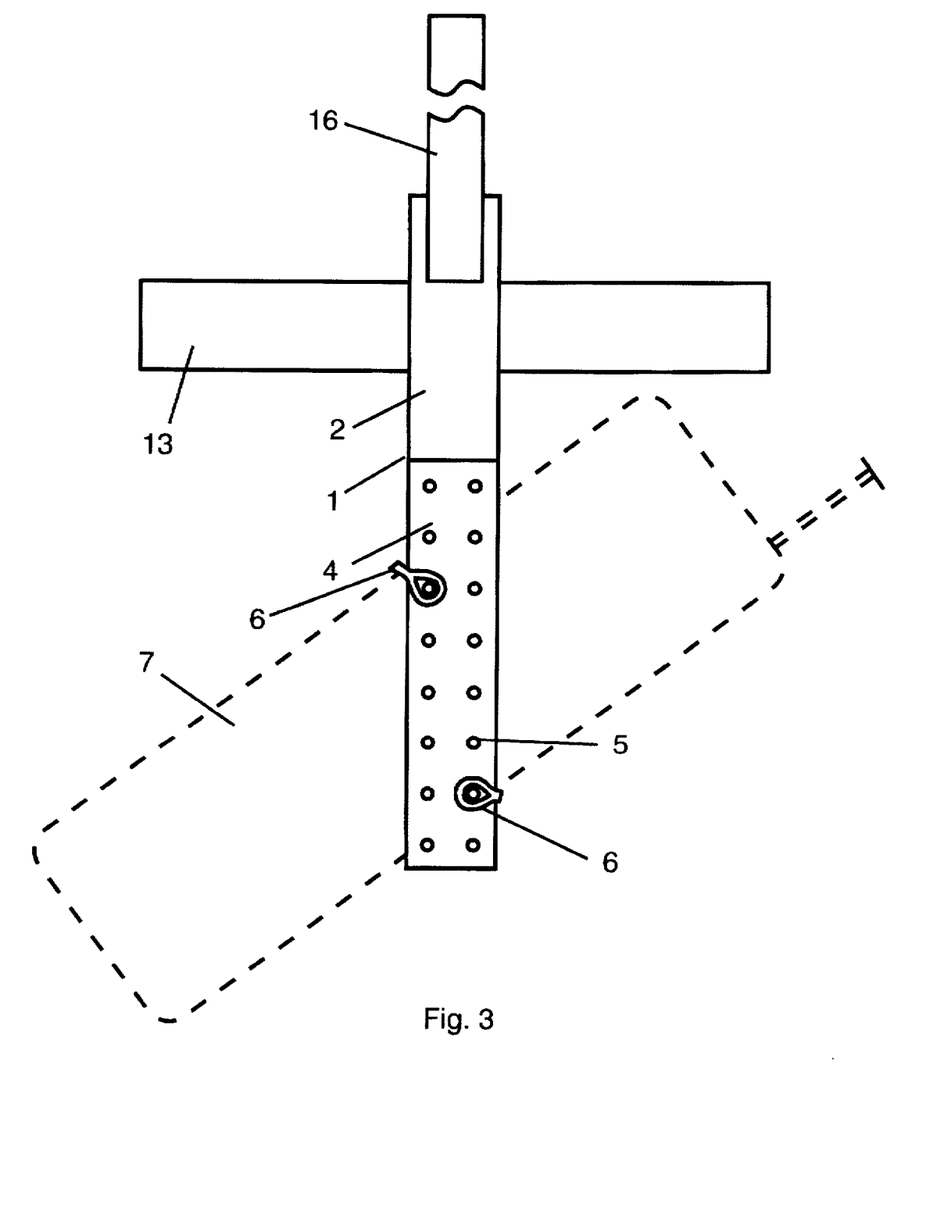
FIG. 3 shows the handset holder positioned for left ear usage.

The angle of the handset 7 relative to the handset holder 1 can be reversed as shown in FIG. 3. This allows the user to use the same handset holder 1 for either left ear or fight ear operation of the handset 7. The same restraining strap 6 and studs 5 are used for both left and fight ear operation.

In the preferred embodiment two rows of studs 5 run down the back of the holder bracket lower section 4. One row of studs 5 may be used, especially with narrower holder brackets 1 that are designed for lighter handsets or gentle activities. Loops 10 on the restraining straps are used to secure the restraining straps to the studs 5 in the preferred embodiment. Snaps or other devices may be used to secure the restraining strap to the back of the holder bracket. In the preferred embodiment the restraining strap 6 is an elastic band approximately one-eighth (⅛) of an inch in diameter. A narrower restraining strap 6 may be used for handsets with closely spaced push buttons on the front. Conversely a wider restraining strap 6 may be used for heavier handsets or vigorous activities. The elastic restraining strap 6 used in the preferred embodiment is stretched approximately one fourth (¼) by a five pound weight. A restraining strap 6 that requires less force to stretch may be used for lighter handsets of six (6) ounces or less. A restraining strap 6 that requires more force to stretch may be used for heavier handsets or vigorous activities. A conforming layer 11 on the inside of the holder bracket lower section 4 as shown in FIG. 1 facilitates securing the holder bracket 1 to the curved surfaces of some handset backs 12.

Figure 4:
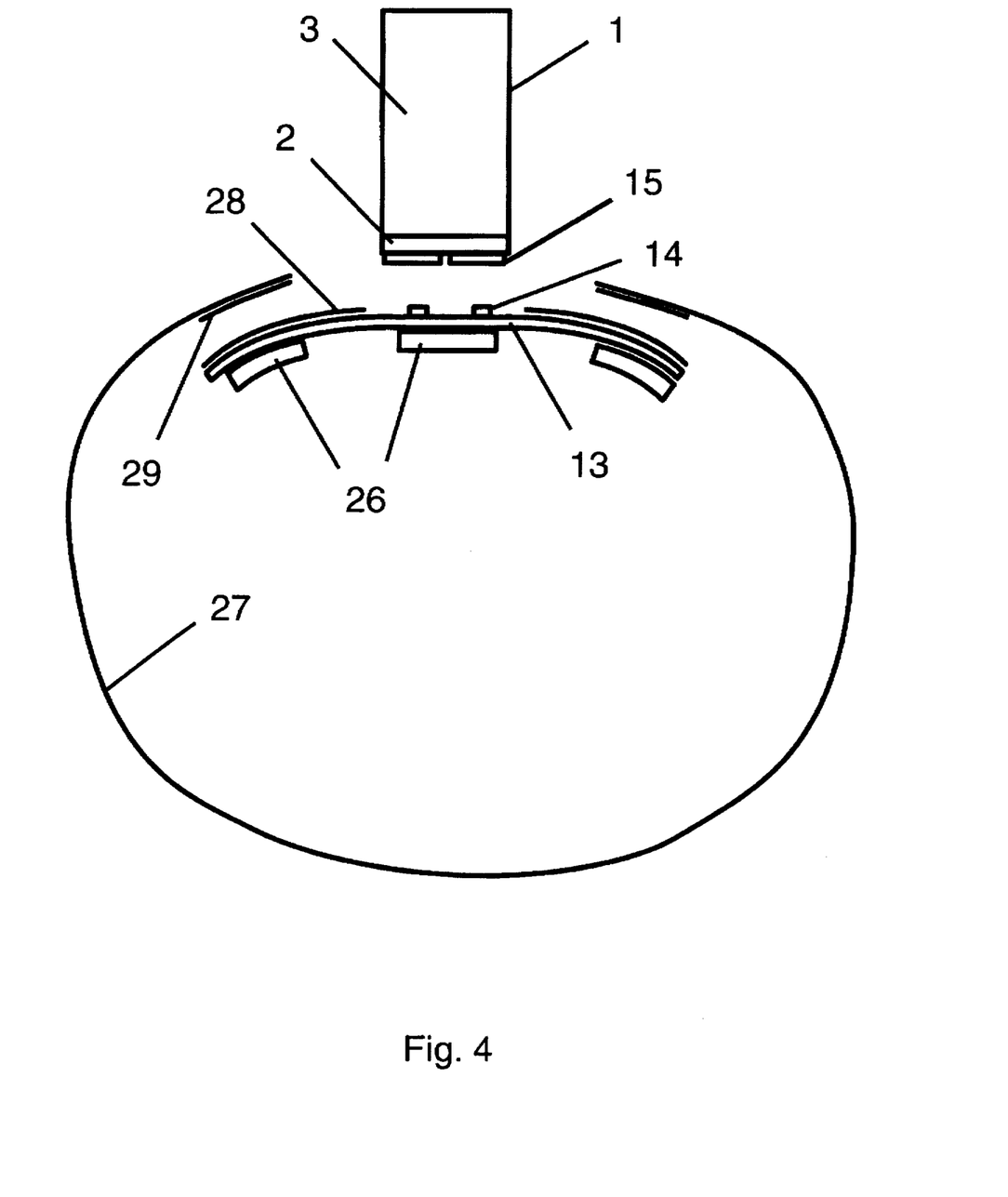

FIGS. 2 and 3 show how the top end of a holder bracket lower section 4 connects to the approximate center of the stabilizer bar 13. The stabilizer bar 13 is approximately six (6) inches long and one (1) inch wide. The stabilizer bar 13 fits against the side of the user's head. As can be seen in FIG. 4, the stabilizer bar 13 is curved so as to conform to the shape of the side of a user's head. When the telephone holding bracket 1 is in position on the user's head, the stabilizer bar 13 is normally approximately horizontal. Users may position the holder so that the stabilizer bar is tilted from horizontal. The stabilizer bar 13 helps maintain the position of the telephone holding bracket 1 relative to the user's head with medium to heavy weight handsets. The stabilizer bar 13 also helps maintain the position of the holder bracket when user's are engaged in activities (such as driving an automobile) that may involve sudden or rapid head movements. The length and width of the stabilizer bar may be reduced for lighter handsets or for less energetic activities. The stabilizer bar may be eliminated for lighter handsets of [roughly six (6) ounces or less] or for relatively sedate activities. Working at a personal computer, which involves relatively slow head movements, is an example of a sedate activity In the preferred embodiment the holder bracket 1 is removable from the stabilizer bar 13. Snap fastener studs 14 and snap fastener sockets 15 are used to secure the holder bracket 1 to the stabilizer bar 13. FIG. 1 shows how the holder bracket 1 is attached to the stabilizer bar 13 by snap fasteners. When the holder bracket 1 and the stabilizer bar 13 are separated, they can be stored in a smaller space. This is especially useful for portable handsets such as cordless telephones and cellular telephones. Other means, such as hock and loop fasteners, may be used to secure the holder bracket 1 to the stabilizer bar 13. Alternatively, the holder bracket 1 and the stabilizer bar 13 may be permanently attached to each other, or constructed as a single unit.

An over-the-head headband 16 is used to secure the holder bracket 1 and stabilizer bar 13 to the user's head. As can be seen in FIG. 2, the lower end of the over-the-head headband 16 extends approximately three (3) inches below the level of the stabilizer bar 13. Users may position the end of the over-the-head headband either in front of or behind their ear depending upon how they want to position the holder bracket 1 with the handset 7 attached. Two (2) or more over-the-head headbands 16 may be used together to increase stability. Adjustment cushions 17 on the inside of the over-the-head headband 16 accommodate variations in user's head sizes and shapes as well as differences in user preferences in headband placement. Adjustment pads 18 may be located on the inside surface of the holder bracket upper section. These pads provide a means for adjusting the distance between the handset and the user's head.

Snap fastener studs 19 on the outside of the holder bracket upper section 2 attach to snap fastener sockets 20 on the inside of the over-the-head headband 16. The snap fasteners secure the over-the-head headband to the holder bracket. The over-the-head headband 16 may be attached to the holder bracket 1 by other means such as hock and loop fasteners. The holder bracket and the over-the-head headband may be permanently attached to each other.

Figure 5:
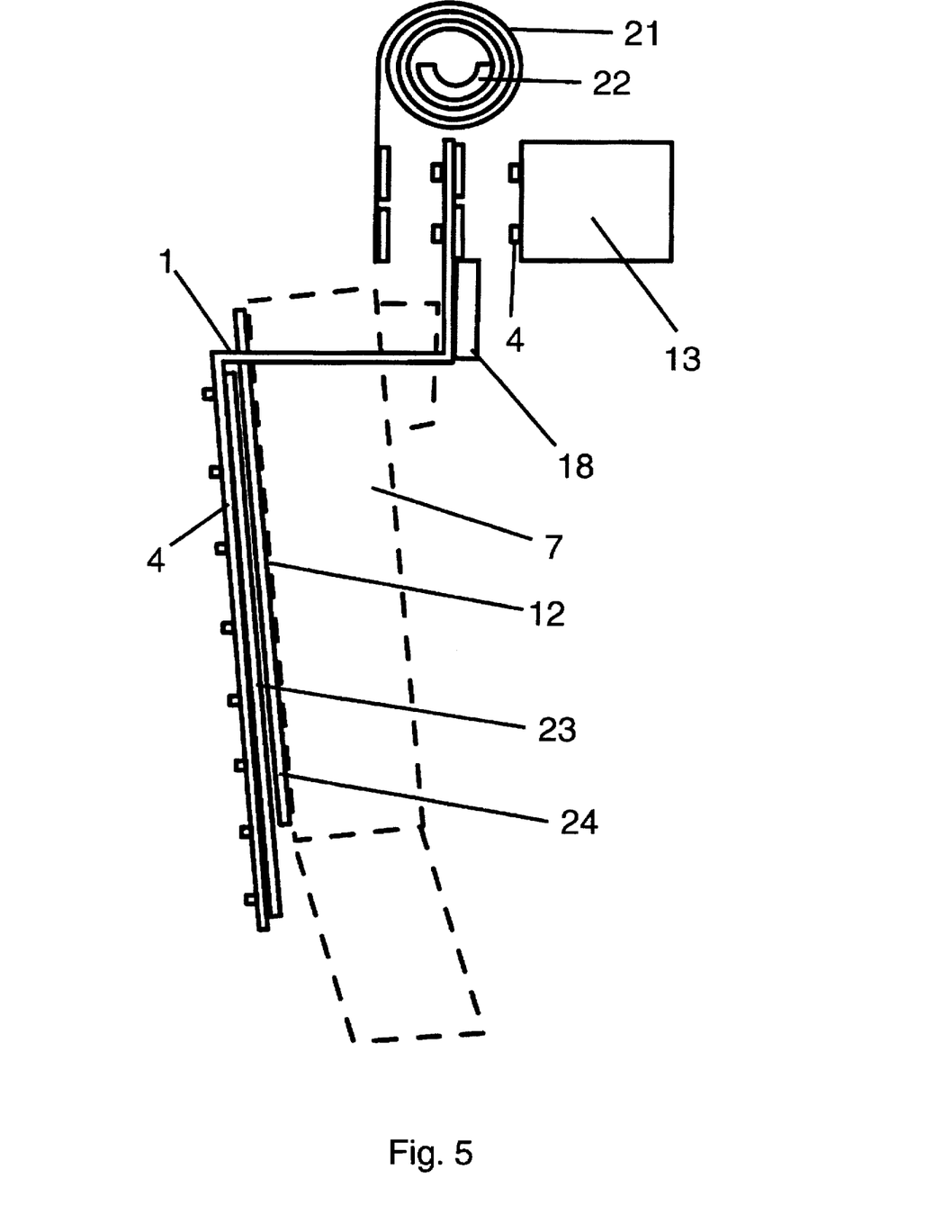
FIG. 5 shows suction cups on the inside of the lower section of the handset bracket.

FIG. 5 shows an optional self curling over-the-head headband 21. The self curling headband 21 takes up less storage space than the standard over-the-head headband 16 of the preferred embodiment. The self curling headband 21 is convenient to use. A user may secure the handset holder 1 to his or her head by merely uncurling the self curling headband 21 and placing it over his or her head. A pad 22 on the end of the self curling headband 21 provides stability. The self curling headband 21 is especially good for use with cellular telephones where storage space is a major consideration.

Optional hock and loop fasteners 23 may be secured to the inner side of the holder bracket lower section 4 as shown in FIG. 5. Other optional hock and loop fasteners 24 may be attached to the back side of the handset. The hock and loop fasteners 23 and 24 may be used in conjunction with the restraining strap 6. This provides additional restraint for heavier handsets or for vigorous activities. The hock and loop fasteners 23 and 24 may be used without the restraining strap 6. The hock and loop fasteners 23 and 24 can be secured more quickly than the restraining strap 6. The hock and loop fasteners 23 and 24 allow users to quickly attach the holder 1 to the handset 7 in order to answer incoming telephone calls. However, use of the hock and loop fasteners 23 and 24 requires that the hock and loop fasteners be permanently attached to the back of the handset 12.

Figure 6:
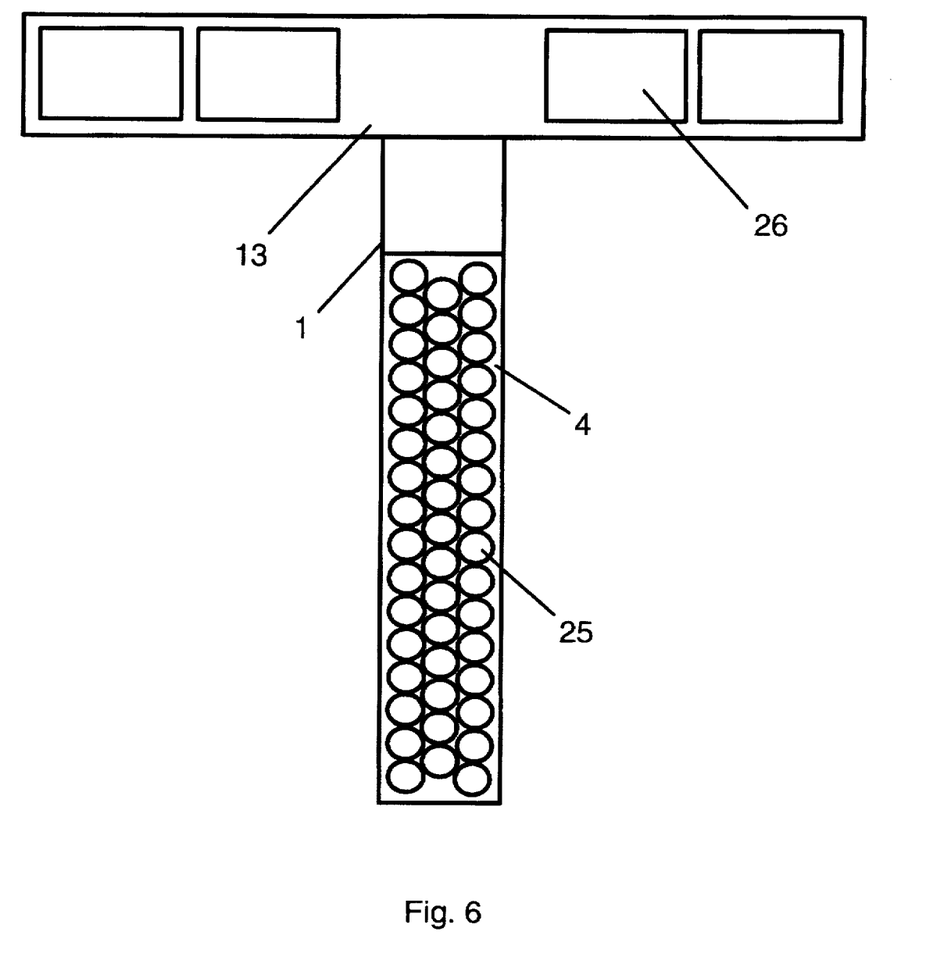
FIG. 6 shows the holder bracket with a wrap-around headband.

Optional suction cups 25 on the inside of the holder bracket lower section 4 as shown in FIG. 6 can be used to secure the bracket to the back of the handset 12. The suction cups are able to adhere to a smooth surface such as the back of many handsets. The suctions cups 25 and/or the restraining strap 6 hold the handset 1 so that the handset speaker 8 and the handset microphone 9 are properly positioned for use. The restraining strap 6 need not be used for conditions where the suction cups 25 alone can secure the handset 7. In these conditions, the user secures the handset 7 to the holder bracket 1 by pressing the back of the handset 12 against the suction cups 25.

Some handsets have a textured or rough surface to enhance the user's grip on the handset. Suctions cups may not adhere firmly to the textured surfaces. Smooth surface tape may be secured to the back of the handset 12 to enhance the holding power of the suction cups 25.

Figure 7:
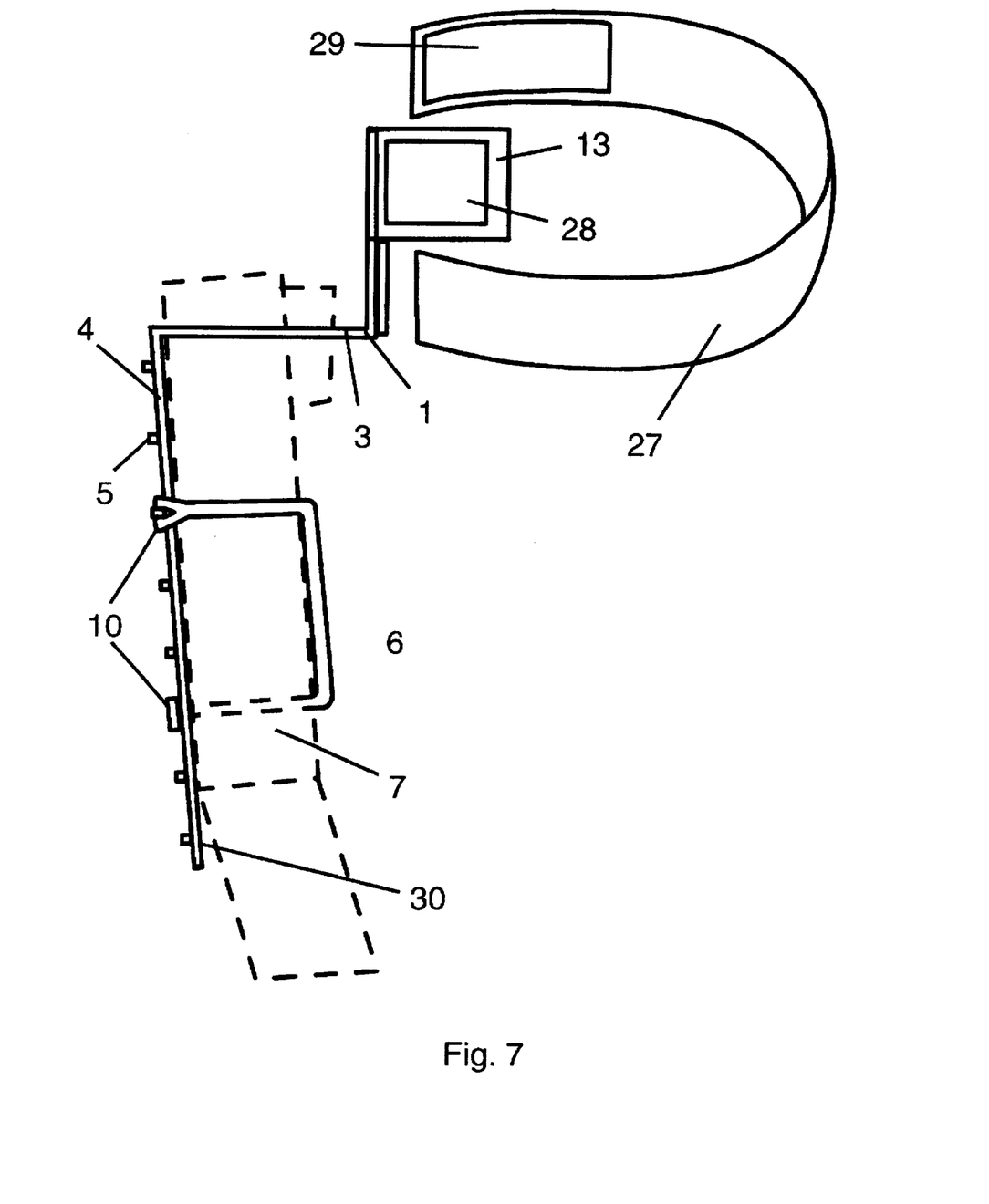
FIG. 7 is a top view of the holder bracket to stabilizer bar attachment system.

Shape adjustment pads 26 as shown in FIG. 4 and FIG. 6 may be placed along the inside of the stabilizer bar 13 to conform to different sizes and shapes of user's heads. Larger size heads are accommodated by placing adjustment pads 26 near the center of the stabilizer bar 13. Smaller size heads are accommodated by placing shape adjustment pads 26 near one or both ends of the stabilizer bar 13. The preferred embodiment of the stabilizer bar 13 is rigid. The stabilizer bar may be constructed of slightly flexible material to conform better to different sizes and shapes of user's heads FIG. 4 and FIG. 7 show how the holder bracket 1 is secured to the user's head by means of a wrap-around headband 27 that extends around the user's head. The wrap-around headband 27 is approximately twenty-one (21) inches long and one (1) inch wide. Hock and loop fasteners 28 are attached to the outer side of the holder bracket upper section 2 and stabilizer bar 13. The headband is woven fabric that, under pressure, will secure directly to the hock and loop fasteners 28 on the outer side of the stabilizer bar 13 and the holder bracket upper section 2. The widths of the holder bracket upper section 4, the wraparound headband 27, and the hock and loop fastener sections 28 can all be increased for vigorous activities.

Some users may want to use wrap-around headbands of different materials that will not secure directly to the hock and loop fasteners 28. A hock and loop fastener section 29 on each end of the wrap-around headband may be used to secure the headband to the hocks. This allows the use of a large variety of styles of headbands that may not secure directly to the hock and loop fasteners 28. The hock and loop fastener sections 18 and 29 that secure the wrap-around headband are approximately three (3) inches long and one (1) inch wide. The width of the hock and loop fastener 28 and 29 may be increased for use with heavier handsets or vigorous activities.

FIG. 7 shows an option of replacing the conforming layer 11 of the preferred embodiment with a non-slip surface or adhesive 30 on the inside of the holder bracket lower section 4. The non-slip surface option reduces the weight of the holder bracket. The adhesive option provides a means for permanently securing the holder bracket 1 to the back of a handset.

Figure 8:
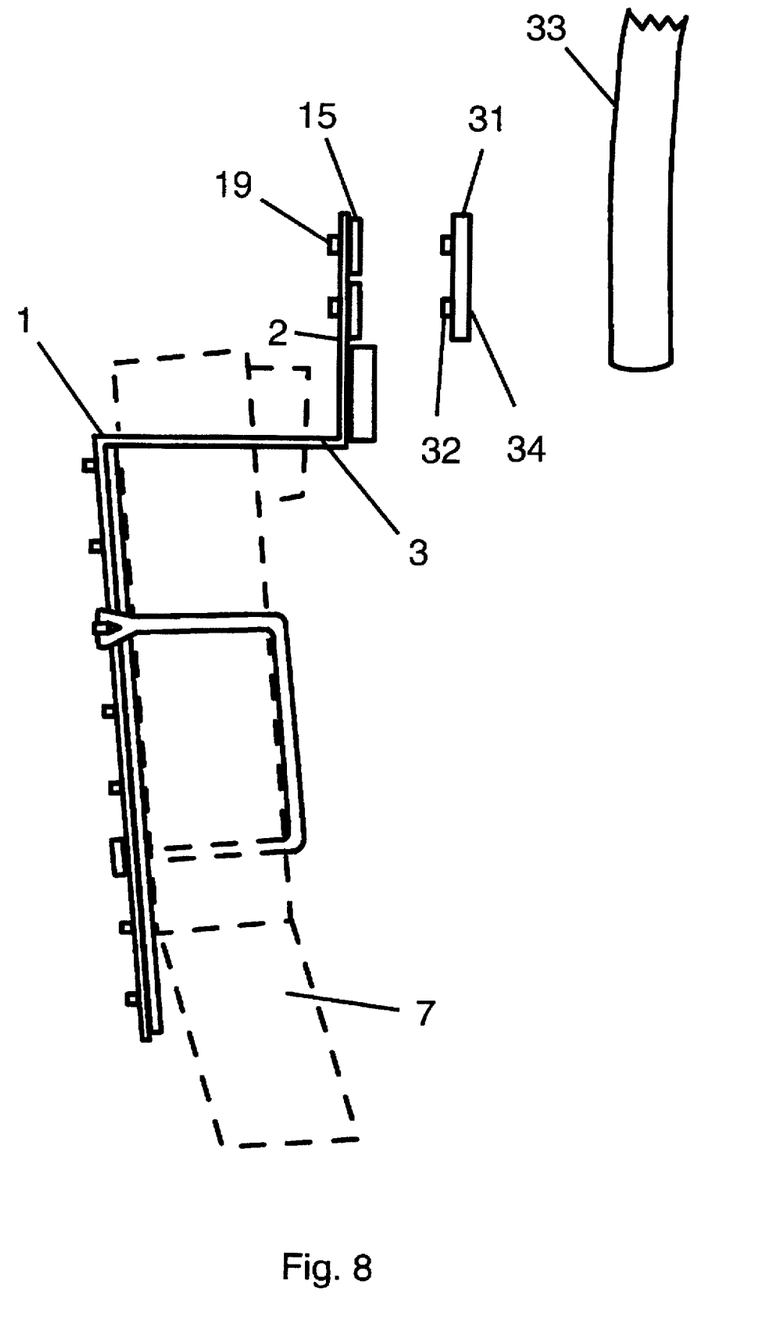
FIG. 8 shows the holder bracket with helmet attachment system.

An optional helmet external attachment plate 31 is shown in FIG. 8. The holder bracket 1 attaches to the helmet external attachment plate 31 by means of snap fastener studs 32 in a manner similar to the manner in which the holder bracket 1 attaches to the stabilizer bar 13. The helmet external attachment plate 31 is normally secured to the outer surface of a helmet 33 by means of adhesive 34. Angle adjustment shims 35 provide a means for users to control the angle between the helmet external attachment plate and the holder bracket 1.

Figure 9:
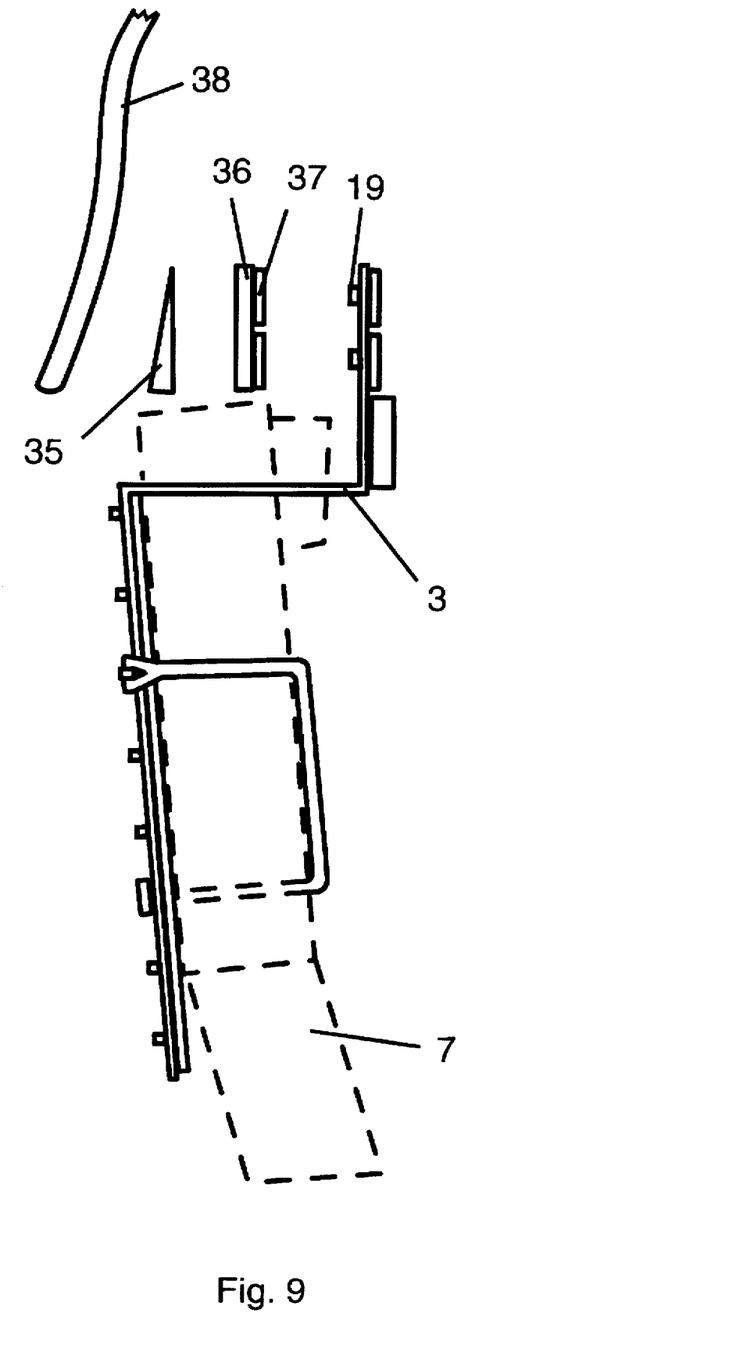
FIG. 9 shows the holder bracket with hard hat attachment system.

FIG. 9 shows an optional hard hat internal attachment plate 36. The holder bracket 1 attaches to the hard hat internal attachment plate 36 by means of snap fastener sockets 37 in a manner similar to how the holder bracket 1 attaches to the over-the-head headband 16. The hard hat internal attachment plate 36 is normally secured to the inner surface of a hard hat 38 by means of adhesive 34. Angle adjustment shims 35 provide a means for users to control the angle between the hard hat internal attachment plate 36 and the holder bracket 1. Other means, such as hock and loop fasteners, can be used to secure the holder bracket 1 to the helmet external attachment plate 31 or the hard hat internal attachment plate 36.

Figure 10:
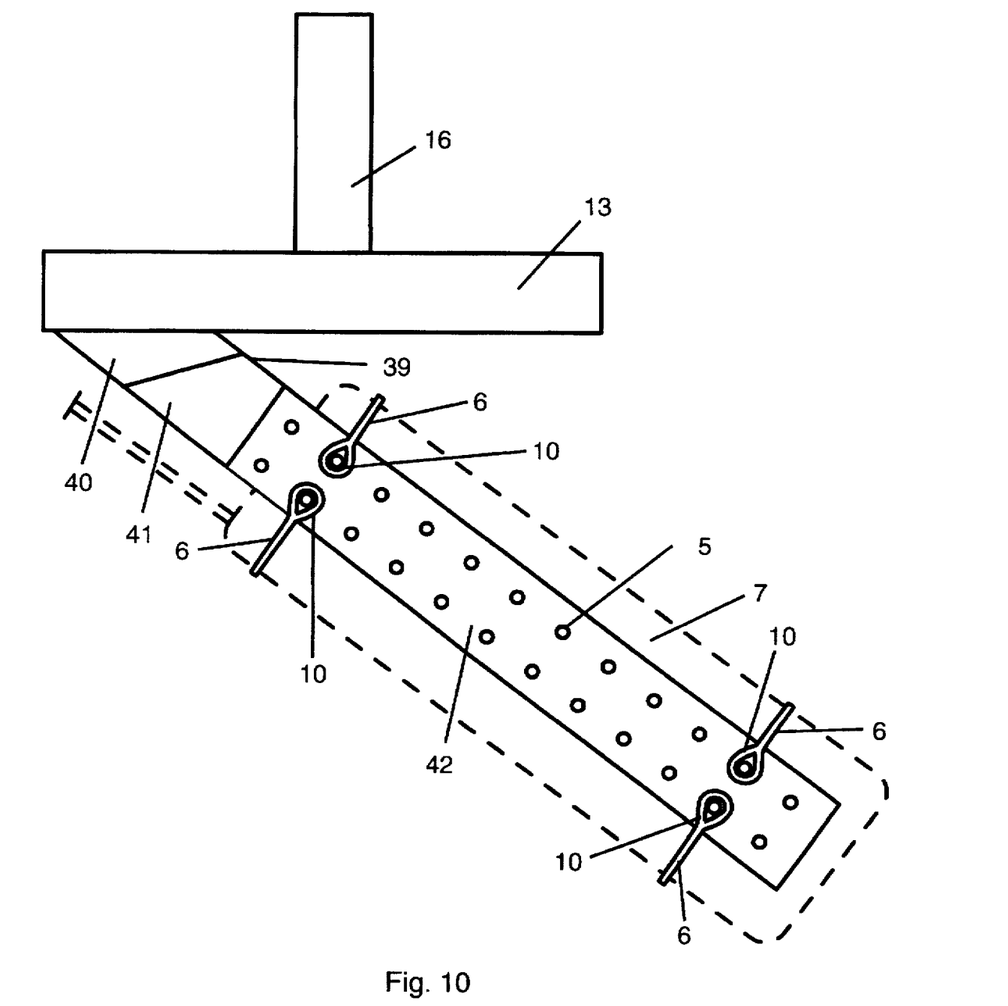
FIG. 10 shows a holder bracket in-line with a handset.
Figure 11:
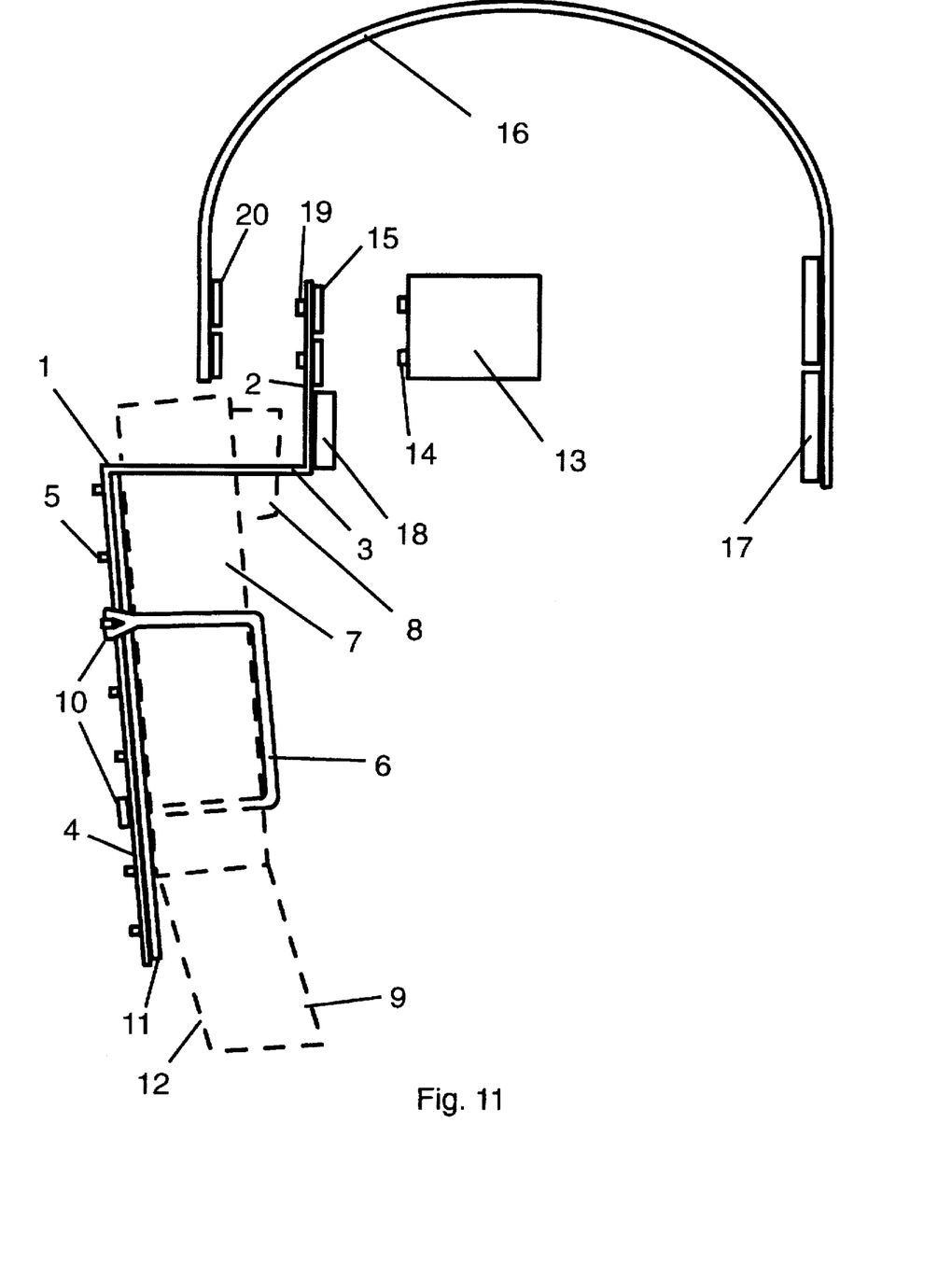

FIG. 10 shows an optional variation of the handset holder bracket. This in-line holder bracket 39 is attached to the stabilizer bar 13 at approximately the angle of the handset 7. The in-line holder bracket upper section 40 attaches to the stabilizer bar 13 behind the user's ear. The in-line holder bracket middle section 41 is angled inward and upward relative to the user's head. These angles position the in-line bracket lower section 42 so that the attached handset 7 is properly positioned for use. The conforming layer 11, the suction cups 25, or hock and loop fasteners 23 and 24 used on the preferred embodiment handset holder bracket can all be used with the in-line holder bracket 39. The in-line holder bracket 39 provides more contact area with the handset 7 than the preferred embodiment handset holder bracket 1. This increased contact area improves the effectiveness of the conforming layer 11, the suction cups 25, or hock and loop fasteners 23 and 24 with heavier handsets and for vigorous activities. Two (2) or more restraining straps 6 can be used with the in-line holder bracket 39. This further increases the stability of heavier handsets for vigorous activities.

Conclusion

The handset holder disclosed here is a simple device that attaches to the backside of a telephone handset and to a user's head. The preferred embodiment of the handset holder and its various options disclosed here can accommodate a wide range of types and sizes of handsets for a wide variety of activities. The disclosed handset holder is much more flexible in use than any prior art handset holder. The handset holder disclosed here is also much simpler and far more cost effective to produce than prior art handset holders.

I claim:

1. An apparatus for holding a handset of a corded telephone, a cordless telephone, a cellular telephone, a compact cellular telephone, or similar communication instrument by means of a rigid holder bracket and a restraining strap, said rigid holder bracket has
- (a) an upper section which is positioned against the user's head,
- (b) a middle section which extends outward from the side of the user's head,
- (c) a lower section which is parallel to the side of the user's head,
- (d) studs on the side of the rigid holder bracket lower section opposite the user's head arranged in rows on the back of the rigid holder bracket lower section, said restraining strap can be removeably attached to one said stud and extended around the handset and removeably attached to another said stud.

said rigid holder bracket positioned for use on either the left or right side of the user's head with the handset speaker and microphone towards the user's head and the backside of the handset towards the lower section of the rigid holder bracket, is secured to the rigid holder bracket by means of said restraining strap.

2. A handset holding apparatus according to claim 1 wherein said upper section of said rigid holder bracket is attached to an approximately horizontal stabilizer bar which provides means to maintain the position of the rigid holder bracket relative to the user's head.

3. A handset holding apparatus according to claim 1 wherein the lower end of said lower section of said rigid holder bracket is angled in towards the user's head.

4. A handset holder apparatus according to claim 1 wherein said rigid holder bracket is secured to the user's head by means of a headband which extends around the circumference of the user's head.

5. A handset holder apparatus according to claim 1 wherein said rigid holder bracket is secured to the user's head by means of a headband which extends over the top of the user's head.

6. A handset holding apparatus according to claim 1 wherein said backside of the handset is secured to said rigid holder bracket by means of miniature hook and eye attachments, hoop and loop fasteners, snaps, buttons, zippers or pins or similar devices.

7. A handset holding apparatus according to claim 1 wherein said rigid holder bracket attaches to a helmet, hardhat or other headgear.

* * * * *